United States Patent [19]

Vetter et al.

[11] Patent Number: 4,917,754

[45] Date of Patent: Apr. 17, 1990

[54] METHOD FOR COATING A SOLID CLOSED SURFACE

[75] Inventors: Heinz Vetter; Walter Hellmann; Otmar Krajec, all of Rossdorf, Fed. Rep. of Germany

[73] Assignee: Röhm GmbH, Darmstadt, Fed. Rep. of Germany

[21] Appl. No.: 341,154

[22] Filed: Apr. 20, 1989

Related U.S. Application Data

[63] Continuation-in-part of Ser. No. 270,525, Nov. 14, 1988, abandoned.

[30] Foreign Application Priority Data

Nov. 26, 1987 [DE] Fed. Rep. of Germany ....... 3740080

[51] Int. Cl.[4] ............................................ B32B 31/18

[52] U.S. Cl. .................................... 156/344; 427/142

[58] Field of Search ............... 156/247, 278, 280, 344; 427/142

[56] References Cited

U.S. PATENT DOCUMENTS 3,930,069 12/1975 Stephens ............................ 427/142

4,201,799 5/1980 Stephens ............................ 427/142

*Primary Examiner*—Robert A. Dawson

*Attorney, Agent, or Firm*—Curtis, Morris & Safford

[57] ABSTRACT

To coat a firm, closed surface having a peelable adhesive masking film thereon, the latter is lifted off the surface at one end and a low viscosity coating composition is poured into the wedge so formed. As the masking film is pulled off further, the wedge moves along the surface, which is thus coated. The coating composition in the wedge is replenished at the rate at which it is consumed.

7 Claims, No Drawings

METHOD FOR COATING A SOLID CLOSED SURFACE

This application is a continuation-in-part of application 07/270,525 filed Nov. 14, 1988 and now abandoned.

The present invention relates to a method for coating a closed surface having a peelable adhesive masking film thereon with a low viscosity coating composition. More particularly, the invention relates to the coating of surfaces of flat substrates such as plates, webs, and sheets.

A surface is firm within the meaning of the invention when a peelable adhesive masking film can be bonded to it all over and subsequently peeled off without the surface being destroyed or damaged. The surface is closed when it is free of voids or breaks at which the masking film is not in contact with the surface. (Fabrics, including nonwovens, do not have a closed surface in this sense.) The application of decorative or functional overlays to flat substrates in the form of plates, webs, and sheets having such firm closed surfaces is practiced on a large scale.

THE PRIOR ART

To protect them from damage during storage, shipping, or processing, sensitive surfaces of flat substrates such as high gloss plastic panels are often proved with an adhesive masking film that can be readily peeled off prior to use. As the masking film is being peeled off, electrostatic charges may be generated that will attract dust particles and hold them to the surface. When such a surface is to be coated with a low viscosity coating material, the surface must first be carefully cleaned and then coated under clean-room conditions.

Various methods are employed to coat firm surfaces with liquid coating compositions: dip coating, brush coating, spray coating, cast coating, knife coating, roll coating, etc. Factors to be taken into consideration when choosing a coating method include the thickness of the intended coating, the viscosity of the liquid coating composition, the processing and equipment costs, the operating speed, and the requirements which the quality of the surface has to meet. With a low viscosity coating composition, very thin coats of high uniformity are best produced by dip coating. To this end, the substrate to be coated is dipped into a bath of the coating composition and withdrawn vertically at uniform speed. The thickness of the coat depends primarily on the viscosity of the coating composition and to a lesser extent on the speed of withdrawal. The method requires a dipping bath that is larger than the substrate. Besides, it is only suited for substrates which can be immersed in a bath and which are to be coated over their entire immersed surface.

Many techniques are known for the roll coating of flat substrates, which have been reviewed by M. Maggi in "Plastics Engineering", March 1984, pp. 61–65. In these techniques, the substrate is passed through a nip formed by two rolls and the coating material is applied to one of the two rolls, which transfers it to the substrate. The coating roll may operate in the direction of the substrate surface or in the reverse direction. High operating speeds and accurate control of coating thickness are obtained. However, when low viscosity coating materials are used, the surface quality is not comparable to that achieved with dip coating.

THE OBJECT AND THE INVENTION

The object of the invention is to provide a method of coating a firm, closed surface provided with a peelable adhesive masking film with a low viscosity coating composition whereby a surface as good as that obtained by dip coating is produced without the entire surface having to be coated, which would require as large a bath volume as dip coating and just as extensive clean-room arrangements. Moreover, it should be possible to coat the surfaces of plates, strips, films, and sheets in continuous operation.

This object is accomplished by lifting the masking film off the surface at one end and pouring the low viscosity coating composition into the wedge between the exposed surface and the lifted masking film, the latter then being pulled off the surface in such a way that the wedge moves along the surface being coated, and the low viscosity coating composition being replenished at the rate at which it is consumed.

The surface may have come with a masking film from production, or the masking film may have been applied to the surface to be coated only for the purposes of the invention. No distinction is made between the two in what follows.

As the masking film is peeled off, the surface to be coated is gradually exposed, a wedge being present at all times at the boundary line between the just exposed surface and the still masked surface, which wedge moves along the surface at the speed at which the masking film is pulled off. In accordance with the invention, that wedge is filled with the low viscosity coating composition. The latter is held in the wedge by capillary action, and the surplus of coating composition in the wedge therefore moves along with the wedge and leaves a uniformly coated surface behind. When the amount of coating composition in the wedge has been consumed and is not replaced, the coating cuts off with a sharp edge.

When the wedge is filled with little liquid coating composition, the capillary action has the effect of distributing the coating composition evenly over the length of the wedge and of drawing out the coating to a uniform thin film as the wedge moves on. When there is a larger amount of coating composition in the wedge, the influence which gravity exerts on its distribution in the wedge and on the backflow of surplus from the coating film into the wedge increases. In this case, it will be advantageous if the wedge extends horizontally and is upwardly open and the surface to be coated is vertical or as nearly vertical as possible in proximity to the wedge. This will also make it much easier to replenish the consumed coating composition in the wedge.

Since the wedge is filled at all times with liquid coating composition, the generation of electrostatic charges and attraction of dust particles is prevented. Therefore no particles of foreign matter are enclosed in the coating. For the production of flawless coatings, it will suffice to prevent the penetration of dust particles into the liquid coating over the path from the wedge to the curing zone. This is less onerous technically than carrying out dip coating under clean-room conditions.

PRACTICE OF THE INVENTION

At least one of the two surfaces which together form the wedge, that is either the surface to be coated or the lifted masking film, is curved about an axis parallel to the wedge. Both surfaces may be so curved. If the surface to be coated is rigid and plane, only the masking film will be curved. When a film is being coated, it may itself be curved. The coating produced will have a high degree of uniformity if the radius of curvature of the curved surface remains constant as the wedge moves along the surface to be coated.

In the free-hand peeling of the masking film, a radius of curvature forms which depends on the pulling force, the pulling angle, and the flexibility of the film. If these parameters are constant, the profile of the wedge will also remain unchanged. However, the radii of curvature will be held constant more reliably if the masking film is pulled off by means of a roll extending parallel to the wedge. The take-up roll preferably has a soft, flexible surface and at the parting line bears on the still adhering masking film. The pulled-off film conforms to the take-up roll and therefore has the latter's radius of curvature in the wedge. The radius of curvature preferably ranges from 10 to 200 mm.

In continuous operation, the wedge will always remain at the same point in the coating machine while the surface provided with the adhesive masking film is led past the take-off point. For the coating of flat substrates such as plates, strips, films, or sheets, a coater is preferably used which is equipped at the take-off point with two parallel horizontal rolls which bear on the two sides of the substrate and allow it to pass upward. Rigid substrates emerge tangentially to the rolls while flexible substrates may conform to the curvature of the rolls over a limited path. Rigid substrates preferably exit vertically upward from the roll nip; however, angles of up to 60 degrees, for example, generally are also usable. If desired, a masking film may be pulled off and a coat applied on both sides of the substrate at the same time.

The method of the invention may be carried out discontinuously in cases where it would be difficult to coat a surface with a uniform thin film of the low-viscosity coating composition any other way. This will be the case, for example, when the surface of an injection mold is to be provided with a coating which during the following injection molding operation is transferred to the molded article. Onto the inner surface of the mold, a masking film is removably adhered and lifted at the edge with formation of a wedge. An appropriate amount of the low viscosity coating composition is poured into the wedge and evenly distributed. As the masking film is gradually removed, the coated mold surface is exposed. In the case of small areas, the coating composition can usually be proportioned accurately enough to be just sufficient for the coating of the surface. If this cannot be done, more coating composition is added as needed and any surplus is drawn off by suction after the masking film has been completely pulled off.

THE COATING

The lower the viscosity of the coating composition, the more uniform the coating produced will be. Under the conditions of application, a viscosity of 500 mPa.s should not be exceeded. The viscosity preferably ranges from 50 to 500 mPa.s.

Uniformity of the coating film is further promoted by seeing to it that the level of the liquid coating composition is as uniform and constant with time as possible over the entire width of the roll nip. This is accomplished by feeding coating composition continuously from one or more nozzles into the nip, or wedge, at the rate at which it is consumed. The nozzles should be spaced closely enough for the coating composition to be distributed evenly over the width of the nip. A spacing of from 2 to 20 cm will be appropriate. However, a slotted nozzle might be used instead. The feed of coating compositon to the nip should be metered so that the no coating composition will run off at the ends of the nip. Such runoff can also be prevented by means of wedgelike sealing members fitted into the nip, or of flexible sealing strips bearing on the sides. With a low liquid level in the nip, capillary action alone will hold the coating composition in the nip so that the latter is evenly filled all the way to its ends yet no coating composition runs off at its open ends.

The wedge is moved along the surface at a speed ranging preferably from about 0.1 to 10 meters per minute, and highly preferably from 0.5 to 2 meters per minute. Higher speeds result in turbulent flow of the coating composition in the wedge, and hence in nonuniform coating. Slower speeds usually are uneconomical as they will lower the productivity and may cause trouble in proximity to the roll nip due the onset of drying.

Flaws in the coating caused by dust particles should, of course, be prevented in the method of the invention just as in the known dip coating method. However, clean-room conditions need to be maintained only in the limited area from the nip to the drying or curing zone. This area can be readily encased in a relatively small housing and kept free from dust by blowing in purified air.

THE MASKING FILM

As a rule, the masking film will cover the substrate completely and will be removably adhered to it, for example by means of a pressure sensitive adhesive. When the masking film consists of a corona discharge-treated polyolefin, it may be bonded to the substrate by thermal lamination without the use of an adhesive. Preferred are flexible masking films of polyethylene, polypropylene, polyester, or polyvinyl chloride of a thickness of from 20 to 100 microns, for example. These films have the effect of binding dust particles which settled on the substrate surface prior to lamination and entraining them as the film is pulled off. The protective film can also be of paper, as is commonly used for the protection of acrylic glass panes. The paper sheet can be fastened with an adhesive which adheres removably on the acrylic glass pane. Suitable adhesives are, for example, gelatine, polyvinyl alcohol, or a layer of a soft latex synthetic resin.

THE SURFACE TO BE COATED

The method of the invention is suitable for the coating of firm, closed surfaces of any kind, proved that their geometry permits the application of a masking film. This is the case with all plane surfaces and surfaces curved about a single axis, such as cylindrical and conical surfaces. Spherically curved surfaces can occasionally be covered with flexible masking films. Preferably, plane surfaces of flat substrates of uniform thickness, such as plates, webs, films, or sheets, are coated. Particularly preferred is the coating of flat, rigid substrates in the form of plane plates or webs.

The surface may consist of any coatable material, which may be different from the material underlying the surface. This surface preferably consists of a plastic. Preferred are thermoplastically extrudable synthetic resins such as polycarbonate, acrylic glass (polymethyl methacrylate or copolymers of methyl methacrylate), polyethylene, polypropylene, ABS resins, polystyrene, or polyesters. They may be crystal clear, or clouded, or colored by pigments or fillers, and may incorporate impact modifiers or other commonly used additives. They may range in thickness from about 10 microns to 1 mm in the case of films and from 1 to 20 mm in the case of sheets. The width of the surface is limited only by the width of the coating machine and may range from 0.2 to 3 meters, for example. The surface may be of any length. For example, films or sheets individually cut to size may be handled, preferably by being passed through the roll nip one after the other in an abutting relationship. In this case it will be advisable to unite the masking films of successive sheets being coated in a continuously operating machine with adhesive tape, for example, at their ends. Endless webs of substrates can also be handled. In this case, the coating machine may be coating on one side or on both sides in one operation; however, films are predominantly coated on one side only and sheets predominantly on both sides.

THE COATING COMPOSITION

The method of the invention lends itself to the application of any kind of decorative or functional overlay to surfaces. The coating composition used may be any curable low viscosity coating composition, provided that it adequately wets the surface and is continuously curable at a sufficiently high rate. Curing may occur physically, by the evaporation of a solvent, or chemically by crosslinking or polymerization. Preferred coating compositions are cured by both methods, a solvent being first evaporated under heat, following which polymerization or crosslinking takes place by the action of ultraviolet radiation, for example. A large number of appropriate coating compositions is known. They are used to produce scratch resistant, UV stabilizing, antireflection, adhesion promoting, or dulling overlays and may optionally incorporate the ingredients required for these purposes in undissolved form. The production of high gloss overlays is of primary importance under the invention.

Typical thicknesses of the cured overlays range from 1 to 20 microns and are produced from layers of the low viscosity coating composition ranging in thickness from 3 to 60 microns, for example. In the method of the invention, the masking film is also coated, automatically. Since the coating produced is thin, the amount of coating composition remaining on the masking film is economically insignificant. To avoid losses of coating composition, the coating composition may be removed from the surface of the masking film with a knife just downstream of the quantity in the wedge in such a way that it will flow back into the wedge. The peeled-off masking film may optionally again be laminated by its uncoated side as a peelable masking film onto the plate or sheet coated in accordance with the invention.

Although the object of the invention is accomplished once a uniform coating has been produced on the treated surface, in practice the operation is always followed by the curing of the coating. The conditions of the cure will depend as usual on the nature of the coating composition. Coating compositions which dry physically cure through evaporation of the solvent. Evaporation can be promoted by heating with heat lamps, heating surfaces applied to the back, or hot air. Chemically curing coating compositions can be cured in the same way by heating or by means of activating radiation such as ultraviolet or gamma radiation, or of an electron beam. In continuous operation, this is advantageously done in a stationary dust free curing tunnel of such length that the coating is fully cured at the rate at which it was applied during its passage through the tunnel. Customary curing times range from 1 to 60 seconds.

What is claimed is:

1. A method for coating a firm, closed surface having a peelable adhesive masking film thereon with a low viscosity coating composition, which method comprises lifting off the masking film from the surface at one end thereof and pouring the low viscosity coating composition into the wedge defined between the exposed surface and the lifted masking film, said surface being generally vertical, said wedge extending horizontally across said surface and being upwardly open, and then pulling off the masking film from the surface such that said horizontally extending wedge moves along the surface to be coated while replenishing the low viscosity coating composition at the rate at which it is consumed.

2. A method as in claim 1 wherein the surface is maintained vertically in proximity to the wedge.

3. A method as defined in claim 1 wherein the coating composition is replenished through one or more nozzles feeding into the wedge.

4. A method as defined in claim 1 wherein a liquid coating composition having a viscosity of less that 500 mPa.s is used.

5. A method as in claim 1 wherein a synthetic resin surface is coated.

6. A method as in claim 5 wherein a surface of a plate or strip of synthetic resin is coated.

7. A method as in claim 6 wherein each of opposing surfaces of said plate or strip is provided with a peelable masking film and the masking films are pulled off and coatings applied on both surfaces simultaneously.

* * * * *